United States Patent
Whitehead et al.

[15] 3,668,248
[45] June 6, 1972

[54] 5-CHLORO-2,4-BIS(SULFAMOYL)FLUOROBENZENE AND 5-CHLORO-2,4-BIS(CHLOROSULFONYL)FLUOROBENZENE

[72] Inventors: Calvert W. Whitehead; John J. Traverso, both of Indianapolis, Ind.

[73] Assignee: Eli Lilly and Company, Indianapolis, Ind.

[22] Filed: Oct. 24, 1968

[21] Appl. No.: 810,409

Related U.S. Application Data

[60] Division of Ser. No. 400,570, Sept. 30, 1964, Pat. No. 3,419,552, Continuation-in-part of Ser. No. 102,385, Apr. 12, 1961, abandoned.

[52] U.S. Cl............................260/543 R, 260/556 S
[51] Int. Cl...................C07c 143/70, C07c 143/78
[58] Field of Search....................260/543 R, 556 S

[56] References Cited

UNITED STATES PATENTS 2,809,194  10/1957  Novello.................260/243
2,835,702  5/1958   Schultz..................260/556

OTHER PUBLICATIONS

Beilstein, Handbuch der Org Chem Vol. 11 (1928) p. 203.
Beilstein, Handbuch der Org Chem Vol. 11 (1950) p. 113–114.
Boggiano et al. J. Pharm. & Pharmacology 12, 419– 425 (1960).

Primary Examiner—Lorraine A. Weinberger
Assistant Examiner—Robert Gesstl
Attorney—Everet F. Smith and James L. Rowe

[57] ABSTRACT

5-Chloro-2,4-bis(sulfamoyl)fluorobenzene, and 5-chloro-2,4-bis(chlorosulfonyl)fluorobenzene are intermediates in the preparation of dihydrobenzothiadiazine-1,1-dioxides, useful as diuretics.

2 Claims, No Drawings

5-CHLORO-2,4-BIS(SULFAMOYL)FLUOROBENZENE AND 5-CHLORO-2,4-BIS(CHLOROSULFONYL)FLUOROBENZENE

CROSS REFERENCE TO PRIOR APPLICATIONS

This application is a division of application Ser. No. 400,570, filed Sept. 30, 1964, now U.S. Pat. No. 3,419,552; which is a continuation-in-part of our copending application, Ser. No. 102,385, filed Apr. 12, 1961, now abandoned.

This invention relates to a novel method of preparing dihydrobenzothiadiazine-1,1-dioxides.

Heretofore dihydrobenzothiadiazine-1,1-dioxides have been prepared from a suitably substituted 2,4-bis(sulfamoyl)aniline, either by direct reaction with an aldehyde or by reaction with an acid to form a benzothiadiazine-1,1-dioxide, followed by reduction of that compound to yield the corresponding dihydro derivative. The bis(sulfamoyl)anilines themselves are generally prepared by sulfonation of a meta-substituted aniline or by sulfonation of a meta-substituted nitrobenzene, followed by reduction of the nitro group to an amine group. The sulfonation step in either instance is not entirely satisfactory, both from the point of view of yield, and of reaction conditions.

It is an object of this invention to provide a method of preparing dihydrobenzothiadiazine-1,1-dioxides from an intermediate which is more readily chlorosulfonated than other intermediates heretofore employed for the same purpose. Other objects of this invention will become apparent from the description which follows.

In fulfillment of the above and other objects, this invention provides a process of preparing 3,4-dihydro-7-sulfamoyl-1,2,4-benzothiadiazine-1,1-dioxides by reacting a 5-chloro-2,4-bis(sulfamoyl)fluorobenzene with an aldehyde plus ammonia, or with an aldehyde-ammonia complex, or with an aldimine. The above reaction can be more readily visualized by reference to the following equation:

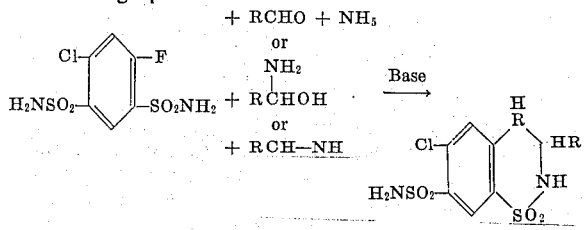

In the above equation, R is hydrogen, $C_1$–$C_5$ alkyl, $C_2$–$C_5$ alkenyl, $C_3$–$C_8$ cycloalkyl, $C_3$–$C_5$ cycloalkyl-substituted $C_1$–$C_5$ alkyl, $C_5$–$C_8$ cycloalkenyl, $C_5$–$C_8$ cycloalkenyl-substituted $C_1$–$C_5$ alkyl, $C_7$–$C_{12}$ bicycloalkyl, $C_7$–$C_{12}$ bicycloalkyl-substituted $C_1$–$C_5$ alkyl, $C_7$–$C_{12}$ bicycloalkenyl, $C_7$–$C_{12}$ bicycloalkenyl-substituted $C_1$–$C_5$ alkyl, halo-substituted $C_1$–$C_5$ alkyl, or monocyclic aryl-substituted $C_1$–$C_5$ alkyl.

In the above definition, the term "aryl" signifies all those ring systems which satisfy the classical criteria for aromaticity, including such ring systems as benzene, pyridine, furan, thiophene, pyrimidine, pyridazine, pyrazine and the like. The aryl ring can be joined to the $C_1$–$C_5$ alkyl group at any unsubstituted position in the aryl ring.

Also included within the scope of the term "aryl" are any of the above aryl rings when substituted with conventional substituting groups, such as for example, halogen, including chlorine, bromine and fluorine; lower alkyl, including ethyl, methyl, isopropyl and n-propyl; lower alkoxy, including methoxy, ethoxy, and n-propoxy; halo-substituted lower alkyl, including trifluoromethyl, trichloromethyl, chloropropyl, and pentafluoroethyl; nitro; and the like.

Illustratively, R can be methyl, ethyl, allyl, n-propyl, isopropyl, methallyl, t-butyl, sec.-butyl, isobutyl, isobutenyl, n-butyl, 1-pentyl, 2-pentyl, 3-pentyl, 3-methylbutyl, 3-methyl-2-butyl, t-amyl, neopentyl, adamantyl, methyladamantyl, 2-methyl-2-butenyl, 2-methyl-3-propenyl, allyl, methallyl, crotyl, cyclobutyl, cyclopropyl, cyclopentyl, cyclohexyl, 3-methylcyclopentyl, 3-ethylcyclohexyl, cycloheptyl, 4-methyl-cycloheptyl, 2-methylcycloheptyl, cyclo-octyl, 1-cyclohexenyl, 2-cyclohexenyl, 3-cyclohexenyl, 2-cyclopentenyl, 3-ethyl-2-cyclohexenyl, 2-cyclopentenyl, 4-methyl-2-cycloheptenyl, 4-cyclo-octenyl, trichloromethyl, trifluoromethyl, chloromethyl, 2-bromoethyl, 2-iodoethyl, benzyl, phenethyl, thienyl, o-chlorobenzyl, m-bromobenzyl, 2,4-dichlorobenzyl, p-nitrophenylpropyl, 2-iodophenethyl, 4-fluorobenzyl, 1-methyl-4-trifluoromethylphenylethyl, thenyl, 2-chlorothenyl, 2-methyl-2-chlorophenethyl, m-tolylethyl, p-anisylethyl, 1-p-nitrophenylethyl, 3-(2,4,5-trichlorophenyl)propyl, m-ethoxybenzyl, 3-methylthenyl, furfuryl, bicyclo[2.2.1]heptanyl, bicyclo[2.2.1]heptanylmethyl, bicyclo[2.2.1]-heptenyl, bicyclo[2.2.1]heptenylmethyl, bicyclo[3.3.0]octanyl, bicyclo[2.4.0]octenyl, bicyclo[3.3.0]octenylethyl, bicyclo[3.3.1]-nonanyl, bicyclo[3.3.1]nonanylmethyl, bicyclo[3.3.1]nonenyl, bicyclo[3.3.1nonenylmethyl, bicyclo[3.1.1]heptanyl, bicyclo[3.1.1]heptanylpropyl, bicyclo[3.1.1]heptenyl, bicyclo[3.1.1]heptenylmethyl, bicyclo[4.2.0]octanyl, bicyclo[4.2.0]octenyl, bicyclo[4.2.0]octenylmethyl, 3-methylbicyclo[4.2.0]octenyl, bicyclo[4.3.1]cyclododecyl, bicyclo[4.3.1]cyclodecylmethyl, bicyclo[5.3.0]cyclodecenyl, 5-methylbicyclo[5.3.0]cyclododecenyl, bicyclo[3.2.0]heptanyl, bicyclo[3.2.0]heptanylethyl, bicyclo[3.2.0]heptenyl, bicyclo[3.2.0]heptenylmethyl, bicyclo[4.1.0]heptanyl, bicyclo[4.1.0]heptanylmethyl, bicyclo[4.1.0]heptenyl, bicyclo[4.1.0]heptenylmethyl, 2-isopropylbicyclo[4.1.0]heptenyl, 2-isopropyl-3-methyl-bicyclo[3.1.0]hexenyl, and like radicals.

In the process represented by the above equation, an aldehyde plus ammonia, an aldehyde-ammonia complex, or an aldimine is reacted in an inert solvent with a 5-chloro-2,4-bis(sulfamoyl)fluorobenzene. The product of the reaction, a 6-chloro-3,4-dihydro-7-sulfamoyl-1,2,4-benzothiadiazine-1,1-dioxide, is isolated by acidifying the reaction mixture, and then collecting the desired acid-insoluble product.

According to the stoichiometry of the above reaction, a mole of ammonia reacts for each mole of aldehyde used in forming the benzothiadiazine ring system and, therefore, at least equimolar amounts of aldehyde and of ammonia should be employed. Preferably, however, an excess of ammonia is used since it is the most readily available reactant. The ammonia can be present either as such or as potential ammonia, derivable from the aldehyde-ammonia complex or from the aldimine. In addition to the ammonia required by the reaction, a second mole of ammonia, or a mole of an alkali metal hydroxide or a tertiary base, should also be present in the reaction mixture to neutralize the hydrogen fluoride which is formed during the ring closure reaction. Among the useful bases are tertiary organic bases, as for example, triethylamine, pyridine, quinoline, and the like, as well as the alkali metal hydroxides—sodium hydroxide, potassium hydroxide, etc. It is more convenient, however, to simply use an excess of ammonia. If ammonia is to supply the second mole of base, the excess can be added with the aldehyde. However, if the second base is a tertiary organic base or an alkali metal hydroxide, it should be added either to the reaction mixture or to the solution of the fluorobenzene. If at least a molar excess of ammonia or other base is not present in the reaction mixture, some of the ammonia needed to form the benzothiadiazine ring system will be tied up in the form of ammonium fluoride with a consequent decrease in yield of the desired product.

In carrying out the reaction, the aldehyde and ammonia are conveniently mixed together, and this mixture is then added to the solution of the 5-chloro-2,4-bis(sulfamoyl)fluorobenzene. When an aldehyde is mixed with ammonia, a reaction takes place yielding a mixture of the aldimine and aldehyde-ammonia complex. While all three of these species, the aldehyde, the aldehyde-ammonia, and the aldimine, are represented as reactants in the above equation, it is believed that the reactive species is either the aldehyde-ammonia or the aldimine since the reaction between the mixture of aldehyde and ammonia with a 2,4-bis(sulfamoyl(fluorobenzene proceeds at a lower temperature than that which is necessary to effect a reaction between the fluorobenzene and ammonia itself. Further evidence in support of such a postulate is furnished by the fact that when the aldehyde-ammonia complex is prepared and isolated as such, it reacts with the 5-chloro-2,4-bis(sulfamoyl)fluorobenzene in the absence of additional ammonia to give a dihydrobenzothiadiazine-1,1-dioxide in about the same yield as when the mixture of aldehyde and excess ammonia is used.

Ammonia beyond that necessary to form the benzothiadiazine ring system plus that needed to react with the hydrogen fluoride by-product is usually not required, provided the reaction is carried out in a sealed vessel. However, since it is also more convenient to carry out the reaction at atmospheric pressure, under which conditions ammonia has a relatively high vapor pressure and will escape from a solution thereof, a considerable excess of ammonia—up to a 10-mole excess—is customarily employed in such cases. This excess ammonia can either be added initially or can be added in increments during the course of the reaction to replace that ammonia lost by vaporization.

As can be seen from the above discussion, an alternative method of carrying out the process of this invention comprises first preparing and isolating the aldehyde-ammonia complex or aldimine, then carrying out the reaction thereof with a 5-chloro-2,4-bis(sulfamoyl)fluorobenzene. With these reactants, it is necessary to add a molar excess of a base to neutralize the hydrogen fluoride by-product of the reaction.

An inert solvent is employed as a diluent in the reaction in order to provide a homogeneous reaction mixture, inasmuch as homogeneous reactions usually proceed more rapidly than hetero-geneous reactions. Among the inert solvents which can be usefully employed are ethanol, dioxane, methanol, isopropanol, or mixtures thereof, and the like. Water can also be present when an organic solvent, with which it is partially miscible, is used. Thus, operative inert solvent mixtures also include aqueous ethanol, aqueous dioxane, aqueous methanol, and the like.

After the aldehyde-ammonia mixture has been added to the solution of the 5-chloro-2,4-bis(sulfamoyl)fluorobenzene in an inert solvent, the reaction mixture is maintained at a predetermined temperature until a substantial quantity of the desired dihydrobenzothiadiazine-1,1-dioxide has accumulated. A reaction temperature in the range 0°–150° C. is usually employed, although higher or lower temperatures are operative. As is well known in the art, the higher the reaction temperature the more rapid the reaction, up to the point where an excessively high reaction temperature yields an excess of undesirable by-products. However, the reaction proceeds with sufficient rapidity at ambient room temperature with most pairs of reactants. Consequently, no exogenous source of heat need be used with such reactants. The reaction customarily goes to completion after about one day at ambient room temperature. If a more rapid reaction is required, the reaction mixture can either be maintained at an elevated temperature, say at about 100° C. for about 5 hours, or the reaction mixture can be left at ambient room temperature for about 12 hours and can then be heated for a period of about 1–2 hours at a temperature in the range 75°–100° C. When the desired reaction temperature exceeds the boiling point at atmospheric pressure of the solvent employed, it is obviously necessary to employ sealed reaction vessels and operate the reaction under autogenous pressure.

As previously stated, the product of the reaction, a 6-chloro-3,4-dihydro-7-sulfamoyl-1,2,4-benzothiadiazine-1,1-dioxide substituted in the 3-position of the benzothiadiazine nucleus, is isolated simply by acidifying the reaction mixture with hydrochloric acid or other suitable acid, and then isolating the benzothiadiazine-1,1-dioxide by filtration or other similar means. The compound thus isolated is readily purified by recrystallization from polar organic solvents.

It is wholly surprising that, in the above reaction, the aldehyde-ammonia complex, or aldimine, or the aldehyde plus ammonia, reacts preferentially with the fluorine atom of the 5-chloro-2,4-bis(sulfamoyl)fluorobenzene to yield a 6-chloro-3,4-dihydro-1,2,4-benzothiadiazine-1,1-dioxide instead of reacting with the chlorine atom to yield the 6-fluoro derivative or reacting with both the chlorine and fluorine atoms indiscriminately to yield an intractable mixture of the 6-fluoro and 6-chloro compounds. The preferential reactivity of the fluorine is particularly surprising when one considers the universally accepted fact that a fluorine atom is bound more strongly to the benzene ring than is a chlorine atom.

The 6-chloro-7-sulfamoyl-3,4-dihydro-1,2,4-benzothiadiazine-1,1-dioxides provided by this invention are useful as diuretics, particularly those compounds substituted by a cycloalkylmethyl, a cycloalkenylmethyl, or a bicycloalkenyl group in the 3-position. The compounds are also useful as chemical intermediates.

This reaction is further illustrated by the following specific examples:

EXAMPLE 1

Preparation of 6-Chloro-3-(5-bicyclo[2.2.1]hept-2-enyl)-7-sulfamoyl-3,4-dihydro-1,2,4-benzothiadiazine-1,1-dioxide 5 g. of liquid ammonia were added dropwise with caution to a solution containing 5 g. of bicyclo[2.2.1]hept-2-enyl)-5-carboxaldehyde in 20 ml. of anhydrous ethanol. The resulting aldehyde-ammonia complex was added to a solution of 10 g. of 5-chloro-2,4-bis(sulfamoyl)fluorobenzene in a solvent consisting of 100 ml. of anhydrous ethanol and 10 ml. of dioxane. The reaction flask was securely stoppered and was maintained at ambient room temperature and at autogenous pressure for about 2 days. The stopper was removed, and the flask containing the reaction mixture was heated under partial reflux for an additional 5 hours, during which time the volume of the solution was reduced to about one-half of that originally present. The residual reaction mixture was poured into about 750 ml. of 0.005 N hydrochloric acid with stirring, thus producing a flocculent white precipitate. The precipitate was collected by filtration and was washed with water. The precipitate was then triturated with hot water in a blender, and was refiltered and dried. Recrystallization of the dried precipitate from anhydrous ethanol yielded 6-chloro-3-(5-bicyclo[2.2.1]hept-2-enyl)-7-sulfamoyl-3,4-dihydro-1,2,4-benzothiadiazine-1,1-dioxide melting at about 235° C.

EXAMPLE 2 preparation of 6-Chloro-3-cyclopentylmethyl-7-sulfamoyl-3,4-dihydro-1,2,4-benzothiadiazine-1,1-dioxide Following the procedure of Example 1, 11.2 g. of cyclopentylacetaldehyde were mixed with 10 g. of liquid ammonia, and the reaction mixture containing the aldehyde-ammonia complex was added to 28.9 g. of 5-chloro-2,4-bis(sulfamoyl)fluorobenzene. 6-Chloro-3-cyclopentylmethyl-3,4-dihydro-7-sulfamoyl-1,2,4-benzothiadiazine-1,1-dioxide thus produced was purified by the procedure of Example 1 and melted at about 230° C.

EXAMPLE 3

Preparation of 6-Chloro-3-(5-bicyclo[2.2.1]hept-2-enyl-7-sulfamoyl-3,4-dihydro-1,2,4-benzothiadiazine-1,1-dioxide 12 g. of bicyclo[2.2.1]hept-2-enyl-5-carboxaldehyde were dissolved in 200 ml. of anhydrous ether. An excess of anhydrous ammonia was added to the solution with stirring. The resulting mixture was maintained at ambient room temperature for about 18 hours. The excess ammonia and ether were then evaporated in vacuo, yielding 14 g. of a white crystalline product, which was a mixture of the aldehyde-ammonia and the aldimine, the latter probably in the form of a trimer.

Analysis—Found: C, 80.53; H, 8.50; N, 8.06; O, 2.91.

5 g. of 5-chloro-2,4-bis(sulfamoyl)fluorobenzene, 2.41 g. of the above aldehyde-ammonia complex prepared from bicyclo[2.2.1]-hept-2-enyl-5-carboxaldehyde and ammonia, and 1.7 g. of triethylamine were dissolved in 25 ml. of dioxane, and the mixture was heated for about 3 hours in an open flask at about 80° C. The reaction mixture was cooled and was poured into water, thus precipitating 6-chloro-3-(5-bicyclo[2.2.1]hept-2-enyl)-7-sulfamoyl-3,4-dihydro-1,2,4-benzothiadiazine-1,1-dioxide formed in the above reaction.

The mixture was filtered, and the collected precipitate was dissolved in 3 N sodium hydroxide. The alkaline solution was filtered, and the filtrate was cooled and was acidified with 5 percent hydrochloric acid, thus precipitating 6-chloro-3-(5-bicyclo-[2.2.1]hept-2-enyl)-7-sulfamoyl-3,4-dihydro-1,2,4-benzothiadiazine-1,1-dioxide, which was purified by the method of Example 1.

EXAMPLE 4
Preparation of 5-Chloro-2,4-bis(sulfamoyl)fluorobenzene 1 kg. of chlorosulfonic acid was placed in a three-neck flask fitted with a stirrer and dropping funnel. 100 g. of 3-chlorofluorobenzene were added dropwise to the stirred chlorosulfonic acid. After the addition had been completed, the mixture was heated gradually to a temperature of about 160° C., where it was maintained for about 4 hours. During the early portion of the heating period, 400 g. of sodium chloride were added in small increments by means of a powder addition flask. All of the sodium chloride had been added by the time the reaction temperature had reached about 120° C. The reaction mixture was added to crushed ice, and the resulting solid comprising 5-chloro-2,4-bis(chlorosulfonyl)fluorobenzene was collected by filtration. The filter cake was washed several times with water and was then dissolved in ether. The ether solution was washed 4 times with cold water and was dried. Evaporation of the ether yielded a residue of 5-chloro-2,4-bis(chlorosulfonyl)fluorobenzene which melted at about 105°–117° C. after recrystallization from a mixture of ether and hexane.

100 g. of 5-chloro-2,4-bis(chlorosulfonyl)fluorobenzene thus prepared were added in small portions of one liter of liquid ammonia in an open beaker. The reaction mixture was allowed to remain at ambient room temperature until the ammonia had evaporated, leaving as a residue 5-chloro-2,4-bis(sulfamoyl)fluorobenzene formed in the above reaction.

Recrystallization of the solid residue from aqueous ethanol yielded purified 5-chloro-2,4-bis(sulfamoyl)fluorobenzene melting at about 223°–224° C.

Analysis—Calc.: C, 25.02; H, 2.03; N, 9.75. Found: C, 25.42; H, 1.99; N, 9.52.

Other benzothiadiazinedioxides which can be prepared by the procedure set forth in Example 1 are listed below in Table I. In the table, Column 1 lists the 3-substituent in the 6-chloro-3,4-dihydro-7-sulfamoyl-3,4-dihydro-1,2,4-benzothiadiazine-1,1-dioxide and Column 2, the melting point.

TABLE I

| 3-Substituent | Melting Point, °C. |
| --- | --- |
| 2-cyclopentenylmethyl | 222 |
| n-hexyl | 172 |
| 2-cyclohexenylmethyl | 221 |
| 3-cyclohexenylmethyl | 215 |
| 1-cyclohexenylmethyl | 225 |
| 3-methylcyclopentylmethyl | 198 |
| cyclohexylmethyl | 232 |
| cycloheptylmethyl | 215 |
| 1-methylcyclohexylmethyl | 245 |
| bicyclo[2.2.1]hept-2-enylmethyl | 210 |
| bicyclo[2.2.1]heptanyl | 263 |
| 5-methyl-2-cyclohexenyl | 230 |
| 6-methyl-bicyclo[2.2.1]hept-2-enyl | 235 |

We claim:
1. 5-Chloro-2,4-bis(sulfamoyl)fluorobenzene.
2. 5-Chloro-2,4-bis(chlorosulfonyl)fluorobenzene.

* * * * *